A. D. BAKER.
STEERING DEVICE FOR VEHICLES.
APPLICATION FILED MAR. 19, 1910.
969,766.
Patented Sept. 13, 1910.
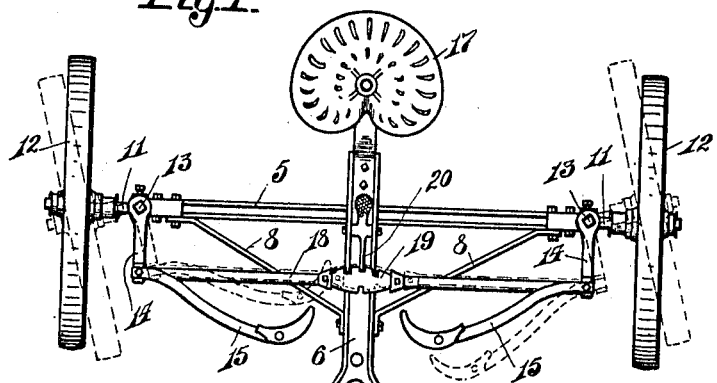
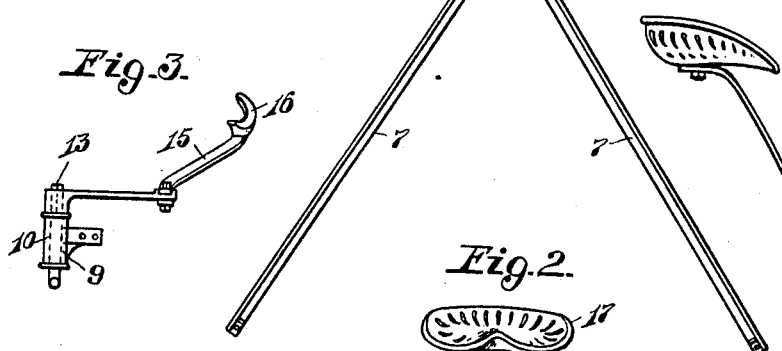
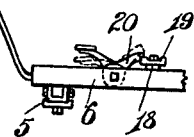
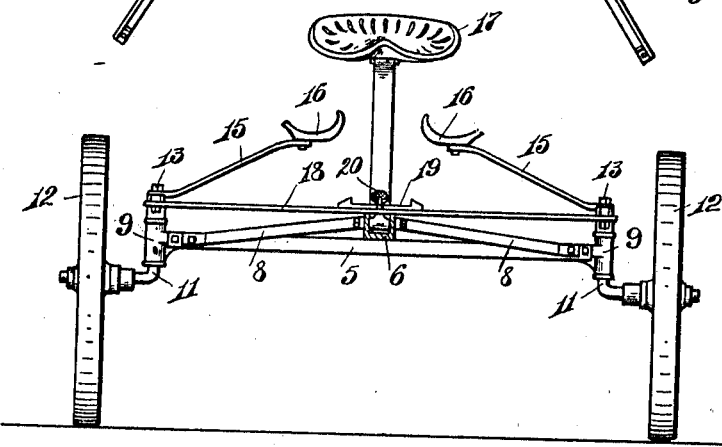
Witnesses:
G. M. Cole
L. D. Nahlen.
Arthur D. Baker.
Inventor
By George J. Oltsch,
Attorney.

UNITED STATES PATENT OFFICE.

ARTHUR D. BAKER, OF SOUTH BEND, INDIANA.

STEERING DEVICE FOR VEHICLES.

969,766.  Specification of Letters Patent.  Patented Sept. 13, 1910.

Application filed March 19, 1910. Serial No. 550,383.

*To all whom it may concern:*

Be it known that I, ARTHUR D. BAKER, a citizen of the United States, residing at South Bend, in the county of St. Joseph and State of Indiana, have invented certain new and useful Improvements in Steering Devices for Vehicles, of which the following is a specification.

This invention relates to steering devices for vehicles and has special reference to improvements in means and manner of steering riding attachments for harrows.

A further object of the invention is the provision of means to permit the riding attachment to be steered at an angle to the direction of pull in drawing the vehicle.

A further object of the invention is to permit the steering means to be manipulated by the feet of the driver, so that he may give his undivided attention to the driving of the horses or other motive force drawing the harrow and the riding attachment.

Another object of the invention is to permit the riding attachment to be steered at an angle to the direction of pull in drawing same, in order to overcome and compensate for slippage when operating upon a hillside, or to enable the operator to steer same so as to avoid running into rows of plantings.

With the above and other objects in view, the present invention consists in the combination and arrangement of parts hereinafter more fully described, illustrated in the accompanying drawings, and particularly pointed out in the claims, it being understood that changes may be made in the form, proportion, size and minor details without departing from the spirit or sacrificing any of the advantages of the invention.

In the drawings:—Figure 1 is a top or plan view of my invention. Fig. 2 is a front view thereof, with the bar for connecting the attachment to a harrow removed. Fig. 3 is a detail view of the steering head and foot lever for operating same. Fig. 4 is a detail view showing the trip member for holding the steering gear in affixed position.

Referring now more particularly to the accompanying drawings, the axle 5 has mounted thereon the usual draft bar 6, to which is attached the tongue for drawing the vehicle, or which may have connecting bars 7, as shown, formed integral therewith, for attaching the vehicle to a harrow or other implement. Stay bars 8 connect the draft bar with the axle in order to strengthen and impart rigidity to the frame as a whole. The axle is provided at each end with a fixed head 9, having a central bore to receive the vertical arms 10 of the L-shaped spindle 11, the wheels 12 being suitably mounted on the other arm of the spindle. The upper ends of the spindles are squared as indicated at 13, arms 14 having squared openings at one end to receive the squared ends of the spindles, and effect a secure locking engagement between said parts and turning of the spindles upon movement of the arms. Fixedly bolted to the upper side of the arms 14 are inwardly extending steering levers 15, upon the free ends of which are mounted pedal members 16, having upturned ends so as to prevent the feet of the operator from slipping, the pedals being disposed the proper distance from the seat 17, so that a person sitting thereon can conveniently reach same with the feet. In order that the opposite wheels may be steered in unison, the arms 14 are pivotally connected at their outer ends by a tie bar 18, which carries a notched plate 19 fixedly secured thereto intermediate its ends, one end of a foot pedal 20 being adapted to engage said notches and lock the tie bar against movement. The notched plate 19, which is reversible, is curved on its opposite edges so that the lateral shift of the tie bar, which varies according to the degree of angle at which the wheels are steered, will bring the notches on the plate in proper position with relation to the foot pedal 20. The notches, by reason of being thus relatively disposed in an arc, are caused to move the proper distance, upon lateral shifting of the bars for engagement by the foot pedal.

The notched plate may be unbolted and replaced in reversed position, so that only one notch will be presented for engagement by the foot treadle, such being used only when it is desired to lock the steering gear in order to have the carriage move permanently straight ahead. Except when thus locked the manipulation of the steering gear is controlled entirely and held to the desired position by the feet of the operator.

It is obvious that by the use of a steering arrangement such as herein described, the operator may compensate for any slippage of the vehicle when working on a hillside, by steering the wheels at an angle to the direction in which the harrow or other implement to which the vehicle is attached is drawn. Furthermore, the steering device permits a much shorter turn to be made than is possible when the wheels are mounted upon a fixed spindle.

While I have described and shown my steering device in connection with a riding attachment for harrows, it is evident that same may as readily be adapted for use in connection with other wheeled devices, and I therefore do not limit myself to the particular use herein described and shown in the drawings.

What I claim is:—

1. In a vehicle, the combination with the wheels, of pivotal spindles upon which said wheels are mounted, crank-arms carried by the spindles, a tie-bar connecting the ends of the crank-arms, foot levers attached to the ends of the crank-arms, and adjustable means for locking the tie-bar against movement.

2. In a vehicle, the combination with the wheels, of pivotal spindles upon which said wheels are mounted, crank-arms carried by the spindles, a tie-bar pivotally connected at its ends to the crank-arms, foot levers attached to the ends of the crank-arms, a double convex notched plate mounted on the tie-bar, and means operable to engage said notches and lock the tie-bar against movement.

3. In a vehicle, the combination with the wheels, of pivotal spindles upon which said wheels are mounted, crank-arms carried by the spindles, a tie-bar pivotally connected at its ends to the crank-arms, foot levers attached at one end to the crank-arms and extending inwardly and upwardly so as to clear the tie-bar, and means operable to lock the tie-bar against movement.

4. In a vehicle, the combination with the wheels, of pivotal spindles upon which said wheels are mounted, crank arms connected with said spindles, a tie-bar connecting the ends of said crank arms, a notched plate secured to said tie-bar, a foot treadle adapted to engage said notches to lock the bar against movement, and foot levers connected with the ends of the crank-arms to serve as a foot rest and as a means for steering the wheels.

In testimony whereof I affix my signature, in presence of two witnesses.

ARTHUR D. BAKER.

Witnesses:
GEO. A. KNOBLOCK,
JOHN M. STAPLES.